May 17, 1949.     A. M. FELLER     2,470,153
RESISTOR AND METHOD OF MAKING SAME

Filed May 25, 1945     2 Sheets-Sheet 1

INVENTOR.
Anton M. Feller
BY
Edward L. Mueller
ATTORNEY

May 17, 1949.　　　　A. M. FELLER　　　　2,470,153
RESISTOR AND METHOD OF MAKING SAME
Filed May 25, 1945　　　　　　　　　　　　2 Sheets-Sheet 2
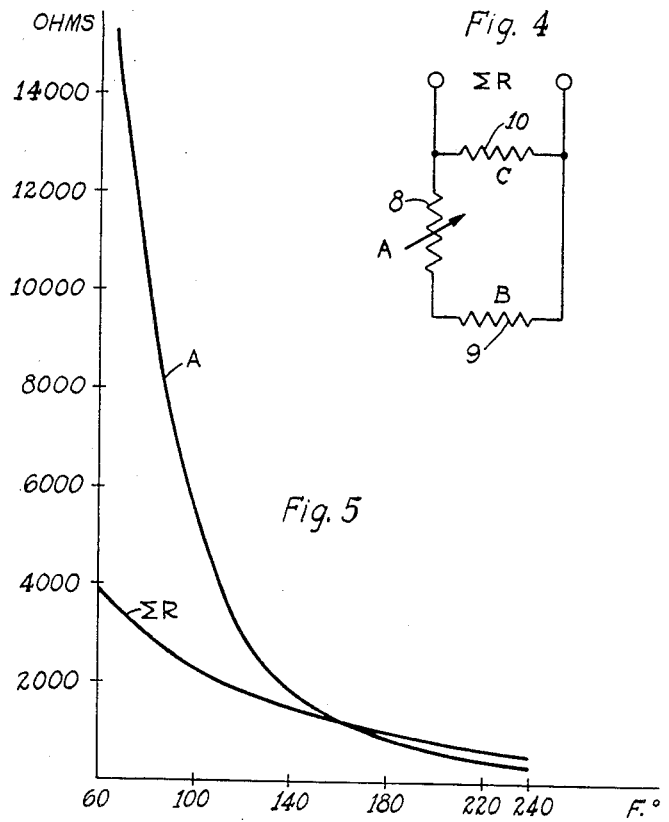
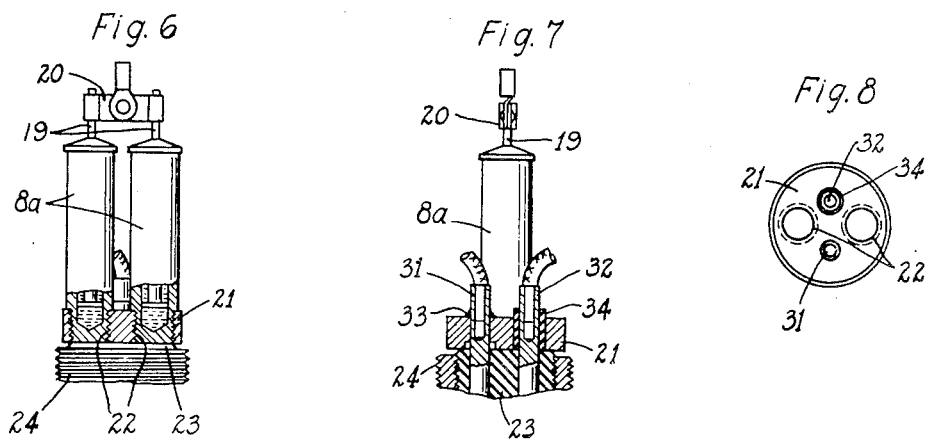
INVENTOR.
Anton M Feller
BY
ATTORNEY Patented May 17, 1949

2,470,153

UNITED STATES PATENT OFFICE 2,470,153

RESISTOR AND METHOD OF MAKING SAME

Anton M. Feller, Elizabeth, N. J., assignor to Control Instrument Company, Inc., Brooklyn, N. Y., a corporation of New York Application May 25, 1945, Serial No. 595,709

4 Claims. (Cl. 201—57)

1

This invention relates to improvements in resistor elements and the method of making same, and has particular reference to a resistor capable of use as a temperature compensator for salinity systems and the like.

In systems of the above character, such as exemplified in the Ellis Patent #2,306,691, dated December 29, 1942, it is necessary to compensate for temperature variations in the fluid under test in order to obtain a direct reading in terms of salt concentration, and this compensation has been customarily accomplished by the manual adjustment of a resistor to the estimated temperature of the electrolyte preliminary to taking a reading.

In a salt solution of given composition such as, for instance, fresh water contaminated with sea water, there exists a definite and fixed coordination of temperature and resistance values. However, these ratios are by no means of a simple mathematical relationship, but, depend also on the constants of the salinity cell and the measuring instrument employed. Therefore, it would obviously be desirable to replace the manually adjustable resistor with one which automatically changes with temperature at the required ratio. For this purpose, it has heretofore been proposed to employ, with each salinity cell, an auxiliary cell containing a solution of known concentration and, by maintaining both cells at the same temperature, the auxiliary cell is used as the controlling means in establishing the proper temperature compensation. However, with the usual frequencies of the order of 60 cycles, it is not possible to completely prevent a certain small amount of polarization and, while it is generally assumed that by using alternating current, the effects of polarization are periodically reversed and thus cancelled, it can be shown that small gas bubbles are formed at the electrodes. Their separation results in a progressive decomposition of the electrolyte and the consequent building up of considerable pressure when the auxiliary cell is constructed in the form of a closed container, as is highly desirable since the instrument is mainly used on ships and in other locations where the precautions taken in laboratories cannot be observed. Continuous stability of a cell such as just suggested, cannot be expected.

According to the present invention, there is provided an improved resistor unit wherein a closed chamber is adapted to contain a covalent compound of relatively low resistance and in which is immersed an electrode for connection to an electrical circuit.

A further feature of the invention is to stabilize the liquid in said resistor by subjecting the latter to prolonged heat and electrical treatments.

The inventive idea involved is capable of receiving a variety of expressions some of which, for purposes of illustration, are shown in the accompanying drawings; but it is to be expressly understood that said drawings are employed merely to facilitate the description of the invention as a whole and not to define the limits thereof, reference being made to the appended claims for this purpose.

In the drawings—

Fig. 4 is a schematic diagram of the resistor unit shown in its relation to series and shunt resistances with which it is employed.

Fig. 5 is a graphic view showing the influence of a resistance network in arriving at the desired resistance value for the resistor unit.

Fig. 6 is an elevation, partly in section, of a modified form of the invention wherein two resistor units are connected in parallel and thermally coupled to a salinity cell.

Fig. 7 is a similar view taken at right angles to Fig. 6, and

Fig. 8 is an end elevation of the salinity cell, with the two resistors removed.

Figure 2:
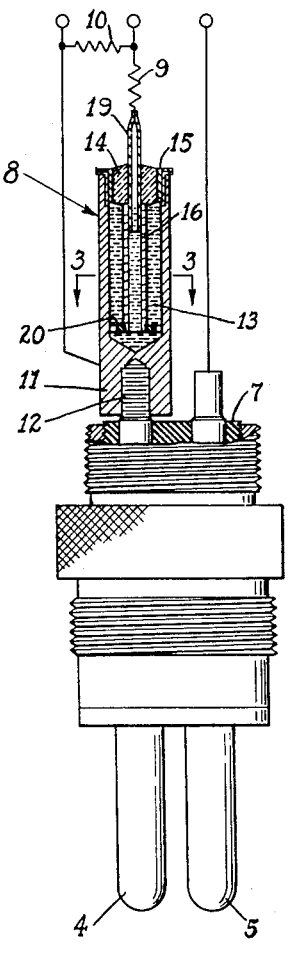
Fig. 2 is an enlarged vertical section through a resistor unit constructed in accordance with the invention and illustrating the manner of its connection to a salinity cell.

The invention is illustrated, by way of example, in its adaptation to a metering system such as disclosed in the previously mentioned Ellis patent and reference is made thereto for a complete understanding of the operation of the circuit. Briefly, as shown herein, the system comprises a meter including field coils 17 and 18 energized by connection to the alternating current transformer 6, and pivotally mounted in the field of said coils are the rigidly connected and movable coils 26, 27 and 28, the first two of which are physically parallel while the coil 28 is arranged at right angles thereto and carries an indicator 30 movable over a calibrated scale (not shown). Said coils are all connected in series with the secondary of the transformer 6 and in this series circuit, as shown in said patent, there is included a variable temperature compensating resistance for which the present invention is substituted. Also, the coils 27 and 28 are included in another series circuit which may be connected, by suitable switches, to any one of the salinity cells 1, 2, or 3, each of which may be of well known construction and includes two electrodes 4 and 5 mounted in a body of insulation 7, with the upper ends of the electrodes protruding from said body for connection in the metering circuit. When additional current flows through the coils 27 and 28, by reason of an increase in the conductivity of the connected cell, the torque of said coils increases and the current in coil 26, and its torque which opposes that of said coils 27, 28, diminishes to some extent so that the resultant effect on the moving coil system is to advance the pointer 30 to correspondingly indicate an increase in the saline content of said cell.

Figure 1:
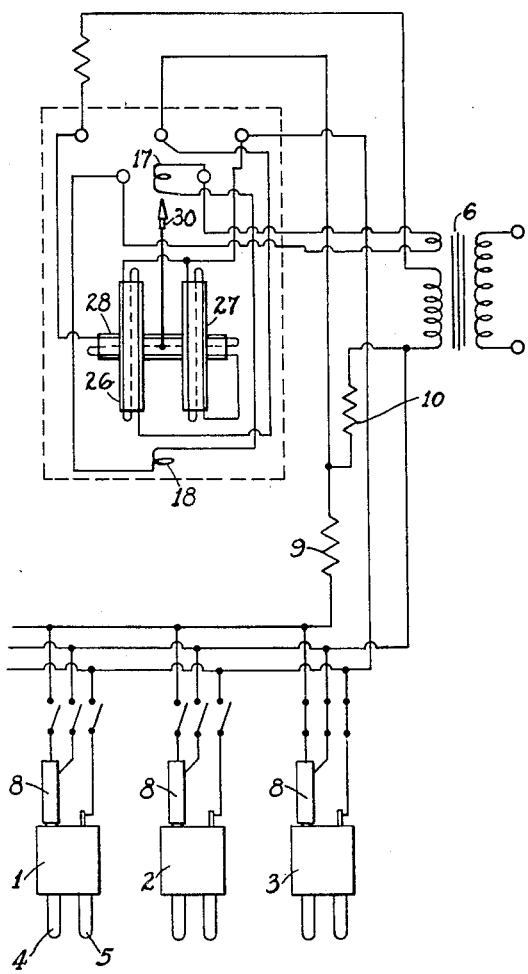
Fig. 1 is a diagrammatic view of a salinity metering circuit showing the present invention applied thereto.

The resistor of the present invention is employed in lieu of the manually adjustable, temperature compensating resistance above mentioned and one or more of such resistors, generally indicated by the numeral 8 in Figs. 1 and 2, are adapted for direct and thermal coupling with the electrode 4 of each of the salinity cells 1, 2, and 3. By thus directly mounting the resistor on the electrode, the former will have the same temperature as the solution to be measured and its resistance will consequently vary automatically with said temperature at the required ratio. In order to obtain the desired resistance value for the compensating resistor, a network of fixed resistances is employed. As shown in Figs. 1 and 2, a resistance 9 is connected in series to a terminal of the resistor unit and has joined thereto a shunt resistance 10.

Fig. 4 shows diagrammatically the arrangement of one of the variable resistor units and its network of fixed resistances with which it is provided for the purpose of arriving at the desired resistance value. In said figure, the compensating resistor 8 is also indicated by the character A, the series resistance 9 of 320 ohms, for example, by the character B, and the shunt resistance 10 of 4300 ohms by the character C. With the required compensating resistance indicated by $\Sigma R$, the following equation is derived:

$$\Sigma R = \frac{(R_A + R_B) \times R_C}{R_A + R_B + R_C}$$

Fig. 5 illustrates graphically the influence of the resistance network in obtaining the required compensating resistance which, as indicated, is an inverse function of temperature, the curve A indicating the resistance of the compensator 8, and the curve $\Sigma R$ representing said required compensating resistance. It will be apparent that in arriving at the correct curvature of the resistance graph, the curvature of the compensator resistance must be definitely coordinated and the selection of the fixed resistances can only produce relatively minor corrections.

Figure 3:
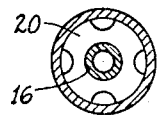
Fig. 3 is a section on the line 3—3 of Fig. 2.

Referring to Figs. 2 and 3, the resistor unit 8 is shown as comprising a cylindrical body 11 which may be made of stainless steel, brass or other suitable heat conducting material which will not produce chemical reaction with the liquid contained therein. At one end of said body, there is formed a screw-threaded opening 12 for receiving the threaded end of the cell electrode 4 whereby said body is thermally coupled to the salinity cell so that the temperature of the resistor unit will always vary in accordance with that of the solution in which the electrodes 4, 5 are immersed. The body 11 is also provided with a chamber 13 adapted to contain a liquid presently to be described, and after the introduction of said liquid, the chamber is hermetically sealed by a glass plug 14 carried within a metallic sleeve 15 inserted and soldered in the open end of said chamber. An electrode 16 is disposed within the chamber 13 and joined at one end to a terminal 19 adapted for connection to the resistance 9. The electrode and terminal are made tubular, as shown, for convenience in filling the chamber 13 and after the introduction of the liquid the outer end of the terminal 19 is sealed in any preferred manner. Said electrode 16 is centered within the chamber by insertion of its reduced lower end into an opening in the apertured disc 20 of insulating material fitted within said chamber 13.

Before sealing the chamber 13, the body 11 is thoroughly cleansed and said chamber is then filled through the terminal 19 with a covalent compound. It has been found that a liquid of low vapor pressure and high boiling point is required and, through many experiments in which glycerol has been used alone and in combination with varying percentages of ethylene glycol, formic acid, allyl alcohol or glacial acetic acid, it has been determined that pure glycerol has yielded the best results in obtaining stabilization of the liquid within the unit. Immediately after filling and sealing the chamber 13, the unit does not show the calculated required resistance value but has a resistance which is about 30–40% too high. In order to decrease the resistance value and produce a liquid having permanent stability, the resistor unit is subjected to a temperature of about 115° C. and to an alternating potential of 10 to 20 volts for a period of from 80 to 120 hours, during which a gradual transition or chemical reaction occurs which is conditioned by pressure resulting within the closed chamber of the unit.

It is possible that resistor units treated as above described may show variations in resistance values and, in order to compensate for such variations, it is further proposed, as shown in Figs. 6 to 8, to connect in parallel matched pairs of compensating units. Thus, a resistor of abnormally high resistance may be coupled to one of low resistance so that the combination will correspond to close tolerances. By following this procedure, a minimum of discards or rejections would be required when manufacturing the units on a production basis. As shown in Figs. 6 to 8, two resistors 8a of substantially the same construction as the unit previously described, have their terminal 19 joined by a strap 20 which is connected to the conductor leading to the series resistance 9. A common mounting for said units 8a is provided in the form of a brass disc 21 having screw-threaded openings 22 for receiving the lower threaded ends of said units. Said disc is mounted upon the slightly projecting end of the insulating core 23 of a salinity cell 24 of known construction whose electrodes 31 and 32 project through said disc. The electrode 31 is in direct and thermal contact with the disc 21 and the latter is secured to said electrode by solder, as indicated at 33, while the electrode 32 is insulated from said disc by the sleeve 34.

What is claimed is:

1. The method of preparing a temperature compensating liquid containing resistor with a negative co-efficient of resistance with respect to temperature, which method comprises introducing glycerol into said resistor, sealing the same and then subjecting said resistor to prolonged heat of approximately 115 degrees centigrade and further subjecting said resistor to electrical conduction to stabilize the resistivity of the liquid therein contained.

2. The method of preparing a temperature compensating liquid containing resistor with a negative co-efficient of resistance with respect to temperature, which method comprises introducing glycerol into said resistor, sealing the same and then subjecting said resistor simultaneously to low voltage and to heat generated by its own power dissipation to stabilize the resistivity of the liquid therein contained.

3. The method of preparing a temperature compensating liquid containing resistor with a negative co-efficient of resistance with respect to temperature, which method comprises introducing glycerol into said resistor, sealing the same and then subjecting said resistor to heat generated by its own power dissipation for a period of from 80 to 120 hours.

4. The method of preparing a temperature compensating liquid containing resistor with a negative co-efficient of resistance with respect to temperature, which method comprises introducing glycerol into said resistor, sealing the same and then subjecting said resistor to a temperature of approximately 115 degrees centigrade for a period of from 80 to 120 hours, and applying a non-polarizing potential of from 10 to 20 volts during that interval.

ANTON M. FELLER.

REFERENCES CITED

The following references are of record in the file of this patent:

UNITED STATES PATENTS

| Number | Name | Date |
| --- | --- | --- |
| 1,089,030 | Angell | Mar. 3, 1914 |
| 1,190,140 | Frank | July 4, 1916 |
| 1,367,102 | Slepian | Feb. 1, 1921 |
| 1,541,817 | Humm | June 16, 1925 |
| 1,774,319 | Crockett | Aug. 26, 1930 |
| 1,868,710 | McCullough | July 26, 1932 |
| 1,906,853 | Hegiger | May 2, 1933 |
| 1,914,939 | Boyer et al. | June 20, 1933 |
| 2,021,491 | Ruben | Nov. 19, 1935 |
| 2,032,077 | Thompson | Feb. 25, 1936 |
| 2,060,417 | Hiscock | Nov. 10, 1936 |
| 2,271,975 | Hall | Feb. 3, 1942 |
| 2,271,531 | Minor | Feb. 3, 1942 |
| 2,306,691 | Ellis | Dec. 29, 1942 |
| 2,375,892 | Bouyoucos | May 15, 1945 |